C. L. GILPATRIC.
Coffee Pot.
No. 100,137.   Patented Feb. 22, 1870.
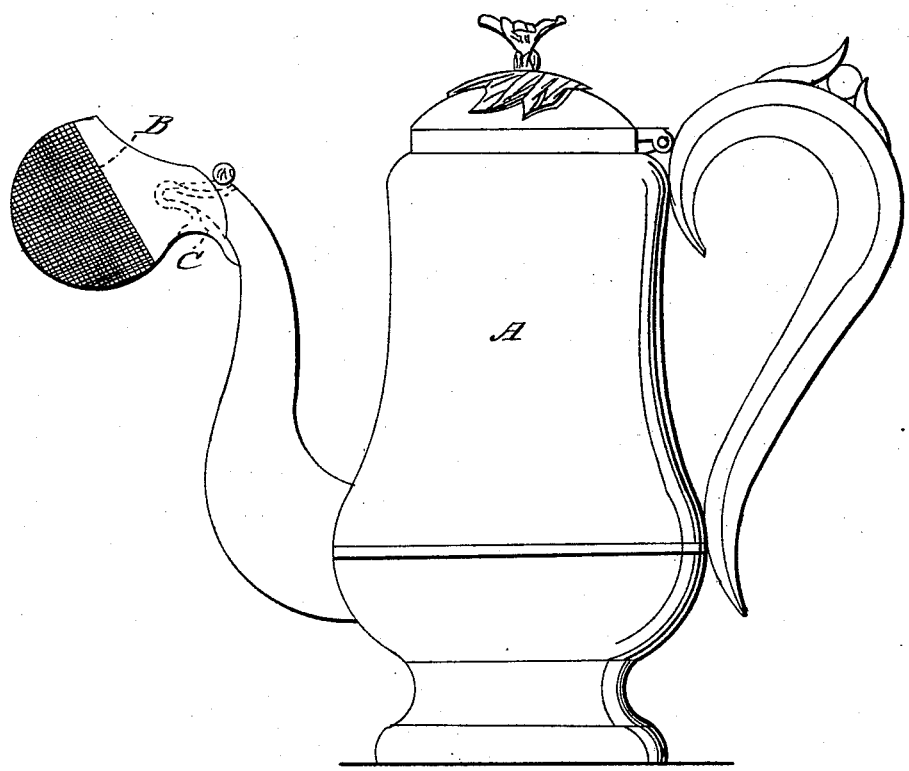
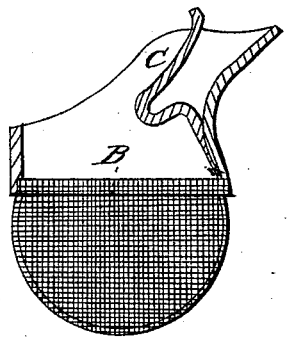

United States Patent Office.

C. L. GILPATRIC, OF HYDE PARK, MASSACHUSETTS.

Letters Patent No. 100,137, dated February 22, 1870.

STRAINER FOR COFFEE-POTS.

The Schedule referred to in these Letters Patent and making part of the same.

*To all whom it may concern:*

Be it known that I, C. L. GILPATRIC, of Hyde Park, in the State of Massachusetts, have invented certain new and useful Improvements in Strainers for Tea and Coffee-Pots; and do hereby declare that the following is a full, clear, and exact description thereof, reference being had to the accompanying drawings and to the letters of reference marked thereon making a part of this specification.

The nature of my invention consists in the manner of attaching a strainer to a tea or coffee-pot, so that it will at all times prevent leaves, grounds, or other sediment from flowing into the cup.

In order to enable others skilled in the art to which my invention appertains, to make and use the same, I will now proceed to describe its construction and operation, referring to the annexed drawings, in which—

Figure 1 is a side view of a coffee-pot, with the strainer attached; and

Figure 2 is a vertical section of the strainer.

A represents an ordinary tea or coffee-pot, to the spout of which the strainer B is attached. Said strainer is made in any of the known and usual ways, but provided with a mouth or lip corresponding somewhat in shape and size to the mouth of the spout of the coffee-pot A.

On the inside of the mouth of the strainer B is secured a spring, C, made of steel or other suitable material, bent in the center, inward, as shown in the drawing.

The spring C is inserted into the spout of the coffee-pot, the front edge of said spout passing into the bend in the spring, while the outer end of the spring presses against the inner side of the spout, the mouth of the strainer bearing against the outer front side of the spout, as seen in fig. 1.

I am aware that strainers have been suspended from springs inserted in the mouths or spouts of coffee or tea-pots, but in those cases the strainers have been dangling from side to side, and it has very often been found necessary to hold the strainer with one hand, while the liquid is poured out with the other. By my invention, however, the strainer becomes, so to say, for the time being, a part of the pot, although it is very readily removed and attached whenever desired.

Having thus fully described my invention,

What I claim as new, and desire to secure by Letters Patent, is—

As an article of manufacture, the herein-described strainer B, consisting of the semicircular sieve connected to a metal hood provided with an interior spring, C, said hood being so formed as to pass around the end of the spout, and be held by said spring, all as shown and described.

In testimony that I claim the foregoing I have hereunto set my hand this 24th day of May, 1869.

C. L. GILPATRIC.

Witnesses:
   C. L. EVERT,
   W. H. H. ANDREWS.